United States Patent [19]

Wilton-Davies

[11] 3,707,959
[45] Jan. 2, 1973

[54] METHOD AND APPARATUS FOR MONITORING ELECTROCARDIAC SIGNALS

[75] Inventor: Colin C. Wilton-Davies, Alverstoke, England

[73] Assignee: National Research Development Corporation, London, England

[22] Filed: July 13, 1970

[21] Appl. No.: 54,550

[52] U.S. Cl. ............................................128/2.06 A
[51] Int. Cl. ................................................A61b 5/04
[58] Field of Search ........128/2.06 A, 2.06 F, 2.06 E, 128/2.06 R

[56] References Cited

UNITED STATES PATENTS

| | | | |
|---|---|---|---|
| 3,554,187 | 1/1971 | Glassner et al. | 128/2.06 A |
| 3,510,765 | 5/1970 | Baessler | 128/2.06 A |
| 3,212,496 | 10/1965 | Preston | 128/2.06 R |
| 3,409,007 | 11/1968 | Fuller | 128/2.06 E |
| 3,518,983 | 7/1970 | Jorgenson | 128/2.06 A |
| 3,552,386 | 1/1971 | Horth | 128/2.06 A |
| 3,500,823 | 3/1970 | Richardson et al. | 128/2.06 E |

*Primary Examiner*—William E. Kamm
*Attorney*—Cushman, Darby & Cushman

[57] ABSTRACT

The method and apparatus for monitoring electrocardiac signals to detect the onset of decompression sickness comprising detecting electrocardiac signals comprising cycles of successive functional periods including an RS waveform, comparing said waveform with standard reference voltages to detect R waves by detecting positive peaks in said waveform above a preset level and to detect S waves by detecting negative peaks below a preset level producing from the detected R and S waves a signal proportional to the R-S interval and indicating the RS interval.

14 Claims, 2 Drawing Figures

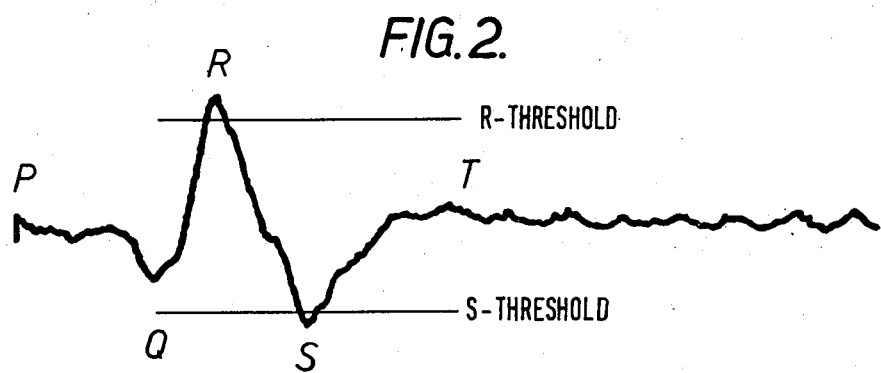

METHOD AND APPARATUS FOR MONITORING ELECTROCARDIAC SIGNALS

The invention described in this application is designed to avoid the disadvantages of decompression schedules as currently derived. The device monitors physiological parameters of the subject, and gives warning when any of these parameters change in such a way as to indicate the approach of decompression sickness. In particular, it has been found that the electrical activity of the heart, the electrocardiogram, changes before decompression sickness becomes apparent; these changes permit the avoidance of decompression sickness if the correct action is taken. Avoiding action will usually consist of discontinuing decompression until the monitored parameters return to normal, but may include short recompressions.

A form of the invention is a device to monitor the time-interval between two parts of the electrocardiographic waveform of the subject and to give a warning if this time-interval exceeds a critical threshold.

Such a device comprises detectors for the two parts of the waveform, a timer to measure the interval between them, a logic section to determine the resulting output, and a warning device to give one or more levels of warning.

The first, or detector stage, optionally includes an amplifier to amplify the electrocardiogram from the normal level of approximately 1 millivolt to a level of 1 or more volts, which is more easily detected by subsequent devices in the system. The output from the amplifier, or the original signal if the amplifier is omitted, is then taken to the inputs of two level detectors or peak detectors. One of these detectors would respond to positive levels or peaks above a preset threshold (R waves), and the other to negative levels or peaks (S waves) below another preset threshold. Whereas it is the normal clinical practice to take electrocardiograms through electrodes attached to the skin of the subject, and for these electrodes to be connected to the measuring apparatus by flexible leads, an improvement which may be included in this invention includes the use of electrodes rigidly mounted on the monitoring device. These electrodes would preferably be of a multipoint or capacitive type, so as to avoid the need to use conductive jelly as in conventional electrocardiography. Electrical contact would then be maintained by the pressure of the monitoring device against the skin of the subject's chest. This pressure could be supplied by an elastic harness or diving suit.

A form of the second, or timing stage, could consist of a voltage ramp generator started by an output from the R wave detector and stopped by an output from the S wave detector. The output of the ramp generator would then be proportional to the R-S interval of the electrocardiogram.

Another form of the timing stage could consist of an bistable multivibrator which is started by an output from the R wave detector and stopped by an output from the S wave detector. The number of pulses produced in one burst would then be proportional to the R-S interval.

A form of the third, or logical stage, could consist of one or more level detectors receiving the output from the timing stage. A single level detector could be used to indicate an alarm condition when the input to it exceeded a preset threshold. An improvement would include a second level detector set at a different threshold, so that two levels of alarm condition might be indicated. The lower level, for example, could be used to advise the need for a pause in decompression, while the higher level would indicate the need for a recompression. A further improvement embodies the use of a third level detector set at a lower level to the other two, so that an output from this detector unaccompanied by any other would indicate that it was safe to proceed with decompression. A further improvement embodies the use of a fourth level detector set at a higher level to the other three so that an output from it would indicate an impossibly long R-S interval as might occur when contact between the electrodes and subject was lost: this would guard against invalid decisions.

A second form of the third stage consists of a counter which is reset to zero by an output from the R wave detector, and stepped once for each pulse from the bistable multivibrator used in one form of the timing stage, described above. The occurrence of an output from the S wave detector would stop the counting, and the state of the counter could be used to indicate as many warning levels as there are stages in the counter.

The third stage could also contain such logical gates as are necessary to differentiate between different counts or between outputs which are accompanied or unaccompanied by others. For example, in the case of four level detectors, an output from none would indicate a waveform too short to be an R-S interval (noise), a single output would indicate normality, a double output would indicate the need for a pause, a treble output recompression, and so on, since a high level detector would not switch on without those set at lower levels.

A preferred form of the invention utilizing the interval between the R and S waves of the electrocardiogram as the critical parameter is described below, by way of example, with reference to the accompanying drawings, in which:

FIG. 2 illustrates an electrocardiogram signal.

Figure 1:
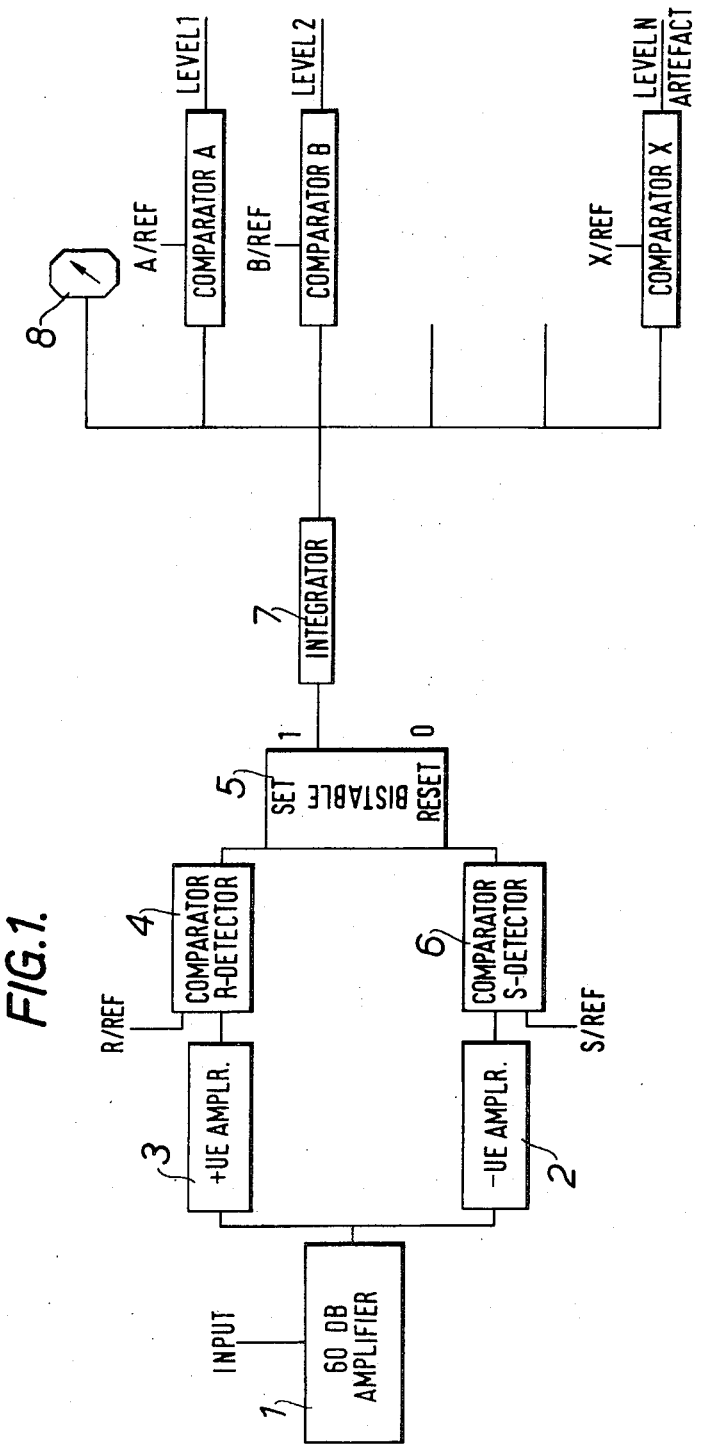
FIG. 1 is a schematic block diagram of the apparatus.

The electrocardiogram signal (ECG) is obtained from electrodes on the skin of the subject. These electrodes are preferably coupled capacitatively rather than resistively to the skin, in which event field-effect transistors should be used as close to the electrodes as possible for impedance matching. Whatever type of electrode used may be applied to any convenient area of the subject where the amplitude of the ECG is high, and that of muscle-generated signals is low. The skin over the sternum is an example of such an area.

Referring to FIG. 1 the first stage of the equipment is an amplifier 1 which is provided to increase the voltage of the ECG from about 1 millivolt to about 1 volt. The output from this amplifier is then divided between the inputs of an inverting amplifier 2 and a non-inverting amplifier 3. The output from the non-inverting amplifier 3 is then compared with a reference voltage (R-Ref) in a comparator (R-detector) 4, and if it exceeds this threshold, the comparator sets a bistable multivibrator 5 to the logical 'one' state.

Similarly, the output from the inverting amplifier 2 goes to a second comparator detector) 6, where it is compared with a second reference voltage (S-Ref). This comparator resets the bistable multivibrator 5 to the logical 'zero' state.

In this way, the bistable is set to 'one' by positive-going waveforms above a certain magnitude, and reset to 'zero' by negative-going waveforms above another threshold. When this waveform is an ECG, as shown in FIG. 2, the bistable will be set by R-waves and reset by S-waves. The width of the pulse or square-wave produced by the bistable will then be equal to the R-S interval of the ECG. If this pulse is integrated by an integrator 7, the value of the integral will be proportional to the R-S interval, and the output of the integrator 7 may then be taken to the warning stage of the invention.

The warning stage of the invention will receive from the integrator a voltage proportional to the average value of the preceding few (preferably about five) R-S intervals. The form of the invention to be used by caisson workers, who may be expected to decompress in dry and lit conditions, may therefore use any convenient form of voltmeter 8 as the warning device. The scale of the meter 8 will be graduated in such a manner as to indicate the course of action to be taken in the case of a given reading.

In the case of divers, who may decompress in wet and dark conditions, it will be preferred to give a digital type of output. A suitable form of indicator might be a number of level detectors each consisting of a comparator in which the output voltage of the integrator 7 is compared with a standard reference signal. In comparator A the lowest level of output voltage (level 1) is detected using a low standard reference signal (A/Ref) which corresponds to a safe level and lights a green lamp. A higher output voltage (level 2) will be detected by comparator B using standard reference signal (B/Ref) and is arranged to light an amber lamp to give a warning to stop decompressing. Further comparators are provided to indicate higher levels of output voltage and are arranged to light a red lamp to give a warning that recompression is required, whilst the highest levels of voltage outputs are detected by comparator X using standard reference signal (X/Ref), which is arranged to light a white lamp indicating an impossible long R-S interval probably produced by loss of electrode contact. In a situation where a diver is in very turbid water and may not be expected to see such lamps, audible tones of different frequencies could be provided to correspond to the different levels. The equipment is arranged so that the various stages are connected together by flexible means so that the first stage including the electrodes may be mounted conveniently on the chest, where the electrocardiogram is of greatest amplitude and most free from noise, and the warning stage may be mounted on or near the head or a limb for greater visibility or audibility.

We claim:

1. The method of monitoring electrocardiac signals to detect the onset of decompression sickness comprising:

detecting electrocardiac signals comprising cycles of successive functional periods including an RS waveform, comparing said waveform with standard reference voltage levels to detect R waves by detecting positive peaks in said waveform above a first preset level and to detect S waves by detecting negative peaks in said waveform below a second present level, producing a signal proportional to the R-S interval, and producing an output indication of said R-S interval.

2. The method of monitoring electrocardiac signals according to claim 1 including the further steps of comparing said signal proportional to said R-S interval with a standard reference voltage level and giving an indication if said signal proportional to said R-S interval exceeds a preset level.

3. The method of monitoring electrocardiac signals according to claim 1 including the further steps of comparing said signal proportional to said R-S interval with a plurality of standard reference voltage levels and given an indication if said signal proportional to said R-S interval exceeds at least one of a number of preset levels.

4. The method of monitoring electrocardiac signals according to claim 1 wherein said step of producing includes the further steps of triggering a voltage ramp generator to produce a ramp signal upon the detected R wave of each RS waveform and causing said generator to end the increase in said ramp signal upon the corresponding detected S wave so that the output of the generator is a voltage proportional to said R-S interval.

5. The method of monitoring electrocardiac signals according to claim 1 wherein said step of producing includes the steps of setting to a first state a bistable multivibrator upon the detected R wave of each RS waveform and setting said multivibrator to a second state upon the corresponding detected S wave so that the width of the pulse produced in said bistable multivibrator is equal to said R-S interval.

6. The method of monitoring electrocardiac signals according to claim 5 wherein said step of producing includes the step of integrating said pulse produced in said bistable multivibrator to produce a signal proportional to said R-S interval.

7. The method of monitoring electrocardiac signals according to claim 6 including the steps of comparing said integrated signal with a standard reference voltage level and producing an indication if said integrated signal exceeds a present level.

8. The method of monitoring electrocardiac signals according to claim 6 including the steps of comparing said integrated signal with a plurality of standard reference voltage levels and producing an indication if said integrated signal exceeds at least one of a number of preset levels.

9. Apparatus for monitoring electrocardiac signals comprising:

means for producing standard voltage reference levels, detecting means for detecting electrocardiac signals comprising cycles of successive functional periods including an RS waveform, comparator means connected to said detecting means for comparing said waveform with a plurality of standard reference voltage levels to detect R waves by detecting positive peaks in said waveform above a preset level and to detect S waves by detecting negative peaks in said waveform below a preset level, means connected to said comparing means and responsive to said detected R waves and S waves for producing a signal proportional to said R-S interval, and means for providing an output indication of said R-S interval.

10. Apparatus for monitoring electrocardiac signals according to claim 9 wherein said means responsive to said detected R and S waves comprises voltage ramp generator means wherein the detected R wave of each RS waveform starts the generator and the corresponding detected S wave stops the generator whereby the output of said generator means is a voltage proportional to said R-S interval.

11. Apparatus for monitoring electrocardiac signals according to claim 9 wherein said means responsive to said detected R and S waves comprises bistable multivibrator means wherein the detected R wave of each RS waveform sets the multivibrator to one state and the corresponding detected S wave sets the multivibrator to its other state whereby the width of the pulse produced in said bistable multivibrator means is equal to said R-S interval.

12. Apparatus for monitoring electrocardiac signals according to claim 11 including integrator means connected to said bistable multivibrator for integrating the pulse produced in said bistable multivibrator means to produce a signal proportional to said R-S interval.

13. Apparatus for monitoring electrocardiac signals according to claim 12 including comparator means wherein said integrated signal is compared with a standard reference voltage level together with indicator means for giving an indication if said integrated signal exceeds a preset level.

14. Apparatus for monitoring electrocardiac signals according to claim 12 including comparator means wherein said integrated signal is compared with a plurality of standard reference voltage levels together with indicator means for giving an indication if said integrated signal exceeds at least one of a number of preset levels.

* * * * *